(12) United States Patent
Buchroeder et al.

(10) Patent No.: US 7,839,581 B1
(45) Date of Patent: Nov. 23, 2010

(54) PLASTIC OPTICAL VIEWER

(75) Inventors: Richard A. Buchroeder, Alhambra, CA (US); Charles Caplan, Tucson, AZ (US)

(73) Assignee: Sharper Vision Optics, LLC, Tucson, AZ (US)

(*) Notice: Subject to any disclaimer, the term of this patent is extended or adjusted under 35 U.S.C. 154(b) by 266 days.

(21) Appl. No.: 12/117,204

(22) Filed: May 8, 2008

Related U.S. Application Data

(60) Provisional application No. 60/916,940, filed on May 9, 2007.

(51) Int. Cl.
*G02B 9/04* (2006.01)
*G02B 23/24* (2006.01)
*G02B 25/00* (2006.01)
*G02B 21/02* (2006.01)
*G02B 13/00* (2006.01)

(52) U.S. Cl. .................. 359/793; 359/362; 359/647; 359/661; 359/744

(58) Field of Classification Search ............... 359/744, 359/362, 799, 647, 661, 793
See application file for complete search history.

(56) References Cited

U.S. PATENT DOCUMENTS

| | | | |
|---|---|---|---|
| 2,416,442 A * | 2/1947 | Grey | 359/399 |
| 5,463,500 A * | 10/1995 | Buchroeder | 359/744 |
| 5,515,209 A | 5/1996 | Caplan | |
| 5,627,690 A | 5/1997 | Caplan | |
| 5,667,291 A | 9/1997 | Caplan | |
| 5,790,323 A | 8/1998 | Caplan | |
| 6,061,189 A | 5/2000 | Caplan | |
| 6,163,413 A | 12/2000 | Caplan | |
| 6,201,640 B1 | 3/2001 | Caplan | |
| 6,667,832 B2 | 12/2003 | Caplan | |
| 6,704,142 B2 | 3/2004 | Caplan | |
| RE39,162 E | 7/2006 | Caplan | |

* cited by examiner

*Primary Examiner*—Scott J Sugarman
(74) *Attorney, Agent, or Firm*—John S. Paniaguas; Katten Muchin Rosenman LLP

(57) ABSTRACT

An optical viewer is disclosed which incorporates plastic lenses which reduce the weight and cost of the optical viewer. In accordance with an important aspect of the invention, the optical design of the viewer is configured to compensate for the inferior optical characteristics of the plastic lenses to provide an optical viewer with comparable performance relative to optical viewers with glass lenses.

14 Claims, 3 Drawing Sheets

Aberrations Over the Field of View

Maximum Scale: ± 250.000 μm 0.486 (Blue)  0.588 (Green)  0.656 (Red)

Aberrations Over the Field of View

Maximum Scale: ± 250.000 μm 0.486 (Blue)  0.588 (Green)  0.656 (Red)

Aberrations Over the Field of View

Maximum Scale: ± 250.000 μω

0.486 (Blue)   0.588 (Green)   0.656 (Red)

Aberrations Over the Field of View

Maximum Scale: ± 250.000 μω

0.486 (Blue)   0.588 (Green)   0.656 (Red)

PLASTIC OPTICAL VIEWER

CROSS REFERENCE TO RELATED APPLICATIONS

This application claims the benefit of and priority to U.S. Patent Application No. 60/916,940, filed on May 9, 2007, hereby incorporated by reference.

BACKGROUND OF THE INVENTION

1. Field of the Invention

The present invention relates to an optical viewer at least one plastic lens with improved optical performance.

2. Description of the Prior Art

Various optical viewers are known in the art. Such optical viewers are used in various applications, such as medical and dental clinical applications. Examples of such optical viewers are disclosed in U.S. Pat. Nos. 6,704,142; 6,667,832; 6,201,649; 6,163,413; 5,790,323; 5,667,291; 5,627,690 and 5,515,209, hereby incorporated by reference. The lenses used in such viewers are made from glass due to the better optical characteristics of glass over plastic. Unfortunately, the use of glass lenses in such optical viewers increases the cost and causes such viewers to be relatively heavy. Thus there is a need for a less expensive and lighter weight optical viewer with comparable optical performance.

SUMMARY OF THE INVENTION

Briefly, the present invention relates to an optical viewer which incorporates at least one plastic lens in order to reduce the weight and cost of the optical viewer. In accordance with an important aspect of the invention, the optical design of the viewer is configured to compensate for the inferior optical characteristics of the plastic lenses to provide an optical viewer with comparable optical performance relative to optical viewers with glass lenses.

DESCRIPTION OF THE DRAWING

These and other advantages of the present invention will be readily understood with reference to the following specification and attached drawing wherein.

DETAILED DESCRIPTION

The present invention relates to an optical viewer which utilizes plastic lenses. The optical viewer is configured to compensate for the inferior optical characteristics of plastic lenses relative to glass lenses by optimizing the off-axis optical quality. The optical viewer in accordance with the present invention is illustrated in FIG. 1 and its performance is illustrated in FIG. 2.

Figure 1:
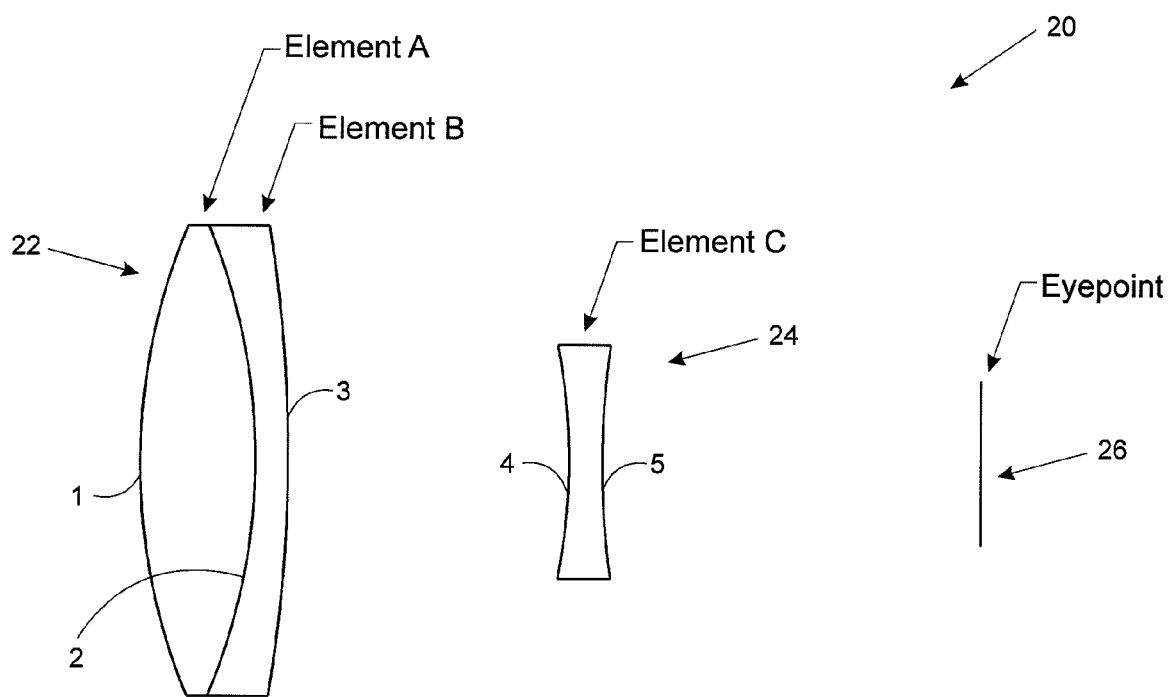
FIG. 1 is an exemplary optical layout for the optical viewer in accordance with the present invention.

Referring first to FIG. 1, the optical viewer in accordance with the present invention is generally, identified with the reference numeral 20 and includes a two element or doublet objective lens 22 formed with Element A and Element B and a single element eyepiece lens 24 formed with Element C. The lenses 22 and 24 are aligned along an optical axis and spaced apart as generally shown in FIG. 1 to provide a magnification of 1.7×. For example, the surface "3" of the objective lens 22 may be spaced 19 mm from the surface "4" of the eye piece lens 24. The surface "5" of the eye-piece lens 24 may be spaced 25 mm from the eye point 26. The eyepiece lens 24 and objective lens 24 are enclosed in a housing (not shown). As shown, the eyepiece lens 24 is spaced away from the eye point 26—the location of a user's eye during use.

Both the objective lens and the eyepiece lens are formed from various plastic materials, such as: PMMA (Acrylic) and polycarbonate, or similar, such as polystyrene. All spherical optical surfaces listed below are nominal; aspheric corrections allowed for compensating for molding deformations. Deliberate aspheric surfaces in the nominal design allow for larger field of view and eye movement.

Lens surfaces that are exposed to the air, i.e. lens surfaces 1, 3, 4 and 5, may be coated with an anti-reflection coating, for example, which provides <0.5% reflectance. The anti-reflective coating may have a wavelength between 480 and 660 nanometers, and applied in an area of the lens surface between 0° and 30° relative to the angle of incidence.

The optical characteristics of the optical viewer in accordance with the present invention with an apparent angular magnification of 1.7× are illustrated in Table 1. Other magnification levels are with the scope of the present invention. The surfaces refer to the surfaces of the objective lens 22 and the eyepiece lens 24, as illustrated in FIG. 1. As shown in FIG. 1, the objective lens 22 is a doublet lens which may be formed from to single lenses which when assembled define three (3) concave surfaces, identified in FIG. 1 as "1", "2" and "3". These surfaces "1", "2" and "3", identified in FIG. 1, correspond to the surfaces "1", "2" and "3" in Table 1. Similarly, the eyepiece lens 24 is a single lens formed with two (2) convex surfaces, identified in FIG. 1 as surfaces "4" and "5" which correspond to the surfaces "4" and "5" in Table 1. The surface 6 refers to the eye point 26. All dimensions in Table 1 are provided in millimeters.

TABLE 1

Exemplary Lens Surface Summary

| Surface | Type | Radius | Thickness | Material | Diameter | Conic | Comment |
|---|---|---|---|---|---|---|---|
| OBJ. | Standard | Infinity | 319.6 | | 76.2 | 0 | |
| 1 | Standard | 36.73 | 7 | Acrylic | 28.5 | 0 | Element A |
| 2 | Standard | −36.73 | 2 | Polycarb. | 28.5 | 0 | Element B |
| 3 | Standard | −87.136 | 19 | | 28.5 | 0 | |
| 4 | Standard | −36.73 | 2 | Acrylic | 14.2 | 0 | Element C |
| 5 | Standard | 49.841 | 25 | | 14.2 | 0 | |
| 6 | Standard | Infinity | 0 | | 10 | 0 | Eye-point |
| STO | Standard | Infinity | −500 | | 10 | 0 | |
| IMA | Standard | Infinity | | | 173.7013 | 0 | |

In addition to the lens surfaces, Table 1 also provides the characteristics of the optical system. In particular, the row identified as "OBJ" in Table 1 refers to the object or thing being viewed. The row identified in Table 1 as "STO" refers to a stop or aperture stop, which is the location of the pupil of the observer's eye. The row identified in Table 1 as "IMA" refers to the image. The image refers the apparent location of the object being viewed through the optical system relative to the stop surface i.e. location of the pupil of the eye of the observer.

In other words, the IMA is the distance where the viewer focuses their eye to see a sharp image.

Referring to Table 1, the object is assumed to be 319.6 mm (millimeters) from the front of the lens or optical system, while the image lies 500 mm leftward (negative sign) of the stop (STO). Since the eye is assumed to be at the right side of the drawing in FIG. 1, the object and its image both lie to the left of the eye point (STO). 500 mm was selected because that distance represents a typical reading distance and the user of these optical devices occasionally look over, under or to the side of the eyepiece. By using 500 mm as the distance between and the apparent location of the image, the eyes of the viewer will not need to adjust when the viewer is not looking through the optical device, thus providing optimal comfort to the viewer when using the optical device. Similarly, viewers wearing bifocals or equivalent optical devices will experience the least amount of strain when the image formed by the bifocals is at the same distance as the close-up segment of the bifocals.

The main thing that plastic (and glass substitute) versions lack, by comparison to superior glass versions, is on-axis acuity. The plastic lenses are inferior to glass lenses and show some image wiggle as the eyes swivel in their sockets. In order to obtain a wider field of view with good optical performance over the sides of that wider field, it is necessary to reduce the on-axis image quality. Prior art viewers and magnifiers produce the sharpest image in the axial viewing region and tolerate distortion and reduction in resolution and contrast the farther one looks outward from the axial region. Normally, the central region of the magnified field of view is intuitively the most important goal. However, in accordance with one aspect of the invention, the optical viewer in accordance with the present invention is deliberately configured with reduced axial image quality in order to improve off-axis quality. The reduced axial resolution and contrast or acuity results from residual spherical aberration that balances against off-axis aberrations, especially astigmatism, used to produce a flat tangential field at approximately 70% of the maximum field of view. Such a configuration results in an optical viewer with a greater overall pleasing image than can be obtained with conventionally-designed magnifiers and viewers.

As mentioned above, the design of the optical viewer was optimized to improve the off-axis image quality. The optical variables involved in optimizing the off-axis image quality include the radii of curvature of the lenses, the lens thicknesses, the airspace between the lens elements and the optical materials from which each of the lens elements are made.

Figure 2A:
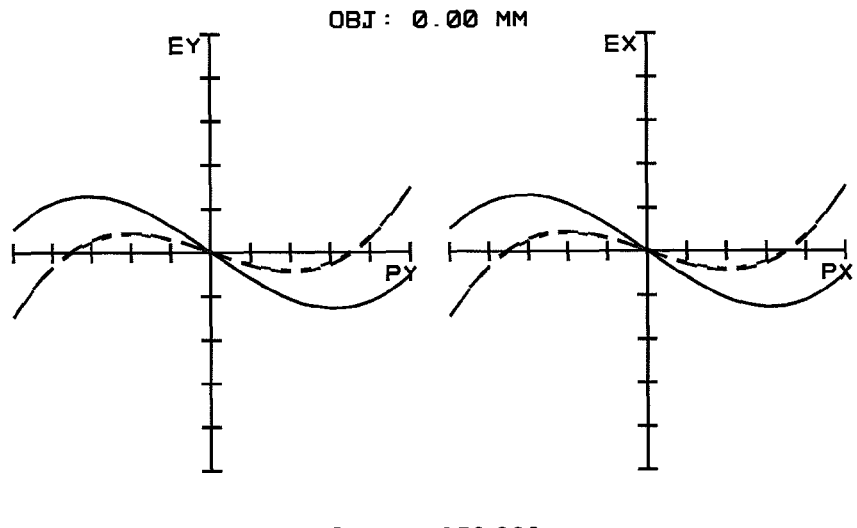
FIGS. 2a-2d are transverse ray aberration plots at four (4) different discrete field points, 0.00 mm, 19.10 mm, 26.70 mm and 38.10 mm from the center of the field for three (3) different colors, 0.486 µm; 0.588 µm and 0.656 µm for an object to be viewed by the optical viewer illustrated in FIG. 1 with plastic lenses, which illustrate the off-axis image quality.
Figure 2B:
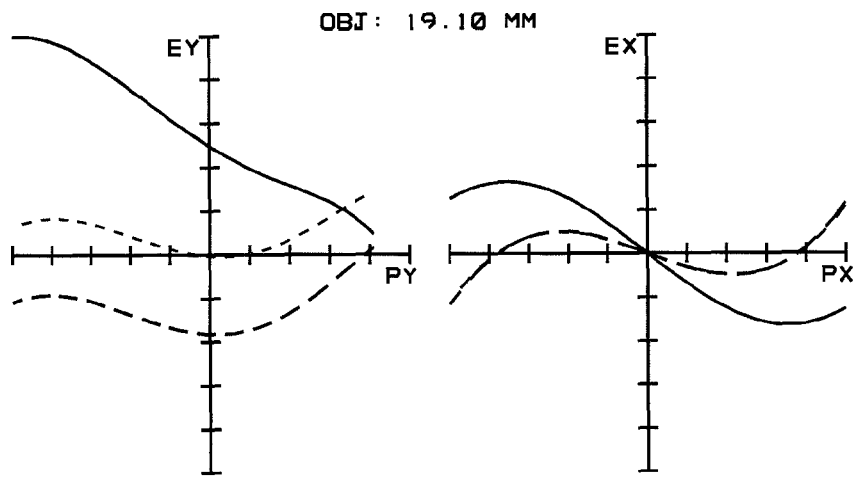
Figure 2C:
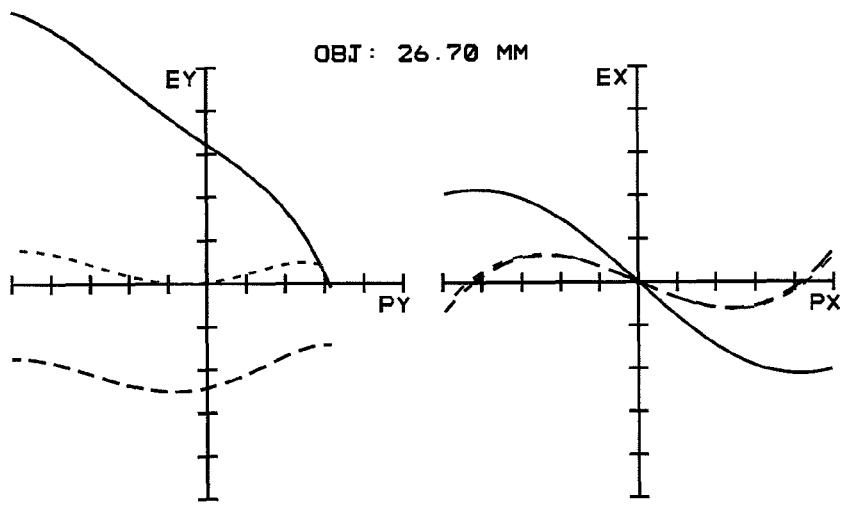
Figure 2D:
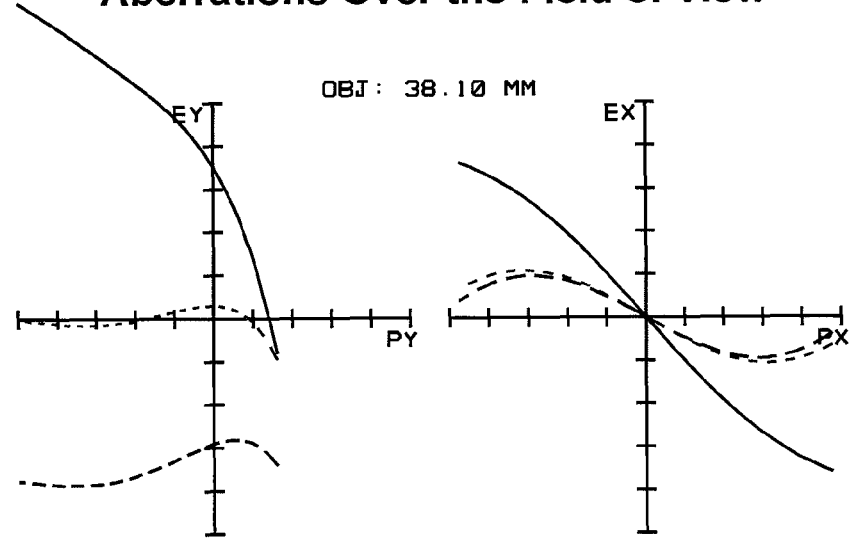

Transverse ray fan plots, for example, as illustrated in FIGS. 2a-2d, are customarily used to evaluate an optical design. As such, the optical performance of the optical viewer 20 is illustrated in terms of the transverse ray fan plots illustrated in FIGS. 2a-2d. More particularly, FIGS. 2a-2d are transverse ray plots at four (4) different discrete points, 0.00 mm, 19.10 mm, 26.70 mm and 38.10 mm with respect to the center of the object to be viewed for three (3) different colors, 0.486 μm (blue); 0.588 μm (green) and 0.656 μm (red) for the optical viewer illustrated in FIG. 1. FIG. 2a at 0.0 mm represents a position at the center of the object to be viewed. In other words, FIG. 2a illustrates the on-axis performance of the optical system. FIGS. 2b-2d illustrate the off-axis performance of the optical device.

The optical performance of an optical system is often evaluated based upon transverse aberrations. Transverse aberrations are a commonly used convention to evaluate geometrically based optical quality. Optical quality may also be based upon longitudinal aberrations and wave front aberrations. Longitudinal aberrations are normally used to explain the field curvature and astigmatism of an optical device. Wave front aberration is used to explain diffraction—based figures, such as the modulation transfer function.

Planes that pass through the object and the optical axis are called meridional or Y planes, while planes that pass through the object at right angles to the Y-plane which pass through the object and contain a central or principal ray from the object to the entrance of the pupil of the optical system are known as sagittal or X-planes. Fans of rays, typically seven (7) rays, are traced through the optical system in the X and Y planes. The intercept of these rays with a reference, image or focal plane, provides transverse aberrations. The departure of the actual ray intersections from the ideal or perfect ray intersections, usually a perfect point in the image plane, produces a corresponding number of data points representing the aberration of the optical system for that field point in that plane. Data points in the meridional or vertical plane, illustrated in FIGS. 2a-2d are identified with the symbol EY. Data points in the sagittal or horizontal plane, illustrated in FIGS. 2a-2d are identified with the symbol EX. The ray tracing is performed in three (3) different colors, i.e 0.486 μm; 0.588 μm; and 0.656 μm. A separate plot symbol, such as dots or dashes forming a wavy line, uniquely illustrate each color's aberration. Each bar on the vertical scale in FIGS. 2a-2d illustrates 0.25 mm. The horizontal plot axis measures fractional or normalized height and width of the pupil in vertical and horizontal planes bearing in mind that the eye uses only a fraction of the nominal 10 mm diameter pupil. The angular size of the blur of a point have a size equal to the transverse aberration shown in the fan rays, divided by the distance from the eye to the image, 500 mm. Therefore, since the vertical plot scale is 250 microns (0.25 mm) in FIGS. 2a-2d, the apparent size off the 0.588 micron (green) image spots is 0.25/500=0.0005 radians or approximately 1.7 arc-minutes in size. The absolute resolution of a light-adapted human eye is approximately 1 arc-minute in size. FIGS. 2a-2d illustrate that an observer will see substantially perfect green images with about 2 to 3 arc minutes of chromatic aberration, which is the same level of quality normally obtained with precision glass lenses. Accordingly, in accordance with the present invention for optical viewers which contain at least one plastic lens, optimal off-axis aberrations in the Y-plane are defined to be less than 2 arc-minutes in green and less than 4 arc minutes for all wavelengths between blue and red and optimal off-axis aberrations in the X-plane are defined to be are less than 2 arc minutes in green and less than 4 arc minutes for all wavelengths between blue and red.

Obviously, many modifications and variations of the present invention are possible in light of the above teachings. Thus, it is to be understood that, within the scope of the appended claims, the invention may be practiced otherwise than as specifically described above.

What is claimed and desired to be secured by a Letters Patent of the United States is:

1. An optical device comprising:
   a doublet lens forming an objective lens; and
   a single lens forming an eyepiece lens, said eyepiece lens spaced a first distance from said objective lens and spaced a second distance from an eye point forming a magnification viewer having an apparent magnification factor; wherein said objective lens and said eye piece lens is formed from plastic, wherein the optical device is configured such that off-axis aberrations in the Y-plane are less than 2 arc minutes in green and less than 4 arc minutes for all wavelengths between blue and red.

2. The optical device as recited in claim 1, wherein said magnification factor is 1.7.

3. The optical device as recited in claim 1, wherein said objective lens is formed from two separate lenses defining element A and element B, wherein said element A and said element B are formed from different plastics.

4. The optical device as recited in claim 3, wherein said element A is formed from acrylic.

5. The optical device as recited in claim 3, wherein said element A is formed from polycarbonate.

6. The optical device as recited in claim 1, wherein said eyepiece lens is formed from acrylic.

7. The optical device as recited in claim 1, wherein said one of said objective and eyepiece lenses is at least partially formed from polystyrene.

8. An optical device comprising:
a doublet lens forming an objective lens; and
a single lens forming an eyepiece lens, said eyepiece lens spaced a first distance from said objective lens and spaced a second distance from an eye point forming a magnification viewer having an apparent magnification factor; wherein said objective lens and said eye piece lens is formed from plastic, wherein the optical device is configured such that off-axis aberrations in the X-plane are less than 2 arc minutes in green and less than 4 arc minutes for all wavelengths between blue and red.

9. The optical device as recited in claim 8, wherein said magnification factor is 1.7.

10. The optical device as recited in claim 8, wherein said objective lens is formed from two separate lenses defining element A and element B, wherein said element A and said element B are formed from different plastics.

11. The optical device as recited in claim 10, wherein said element A is formed from acrylic.

12. The optical device as recited in claim 10, wherein said eyepiece lens is formed from acrylic.

13. The optical device as recited in claim 10, wherein said one of said objective and eyepiece lenses is at least partially formed from polystyrene.

14. The optical device as recited in claim 10, wherein said element A is formed from polycarbonate.

* * * * *